Oct. 7, 1969

R. D. HOUK 3,470,771

TRANSMISSION AND AUXILIARY THROTTLE CONTROL
HAVING A SAFETY INTERLOCK

Filed Jan. 30, 1968

INVENTOR.
RICHARD D. HOUK
BY Hamilton, Cook,
Renner & Kenner
ATTORNEYS

Oct. 7, 1969  R. D. HOUK  3,470,771
TRANSMISSION AND AUXILIARY THROTTLE CONTROL
HAVING A SAFETY INTERLOCK
Filed Jan. 30, 1968  3 Sheets-Sheet 2

INVENTOR.
RICHARD D. HOUK
BY Hamilton, Cook,
Renner & Kenner
ATTORNEYS

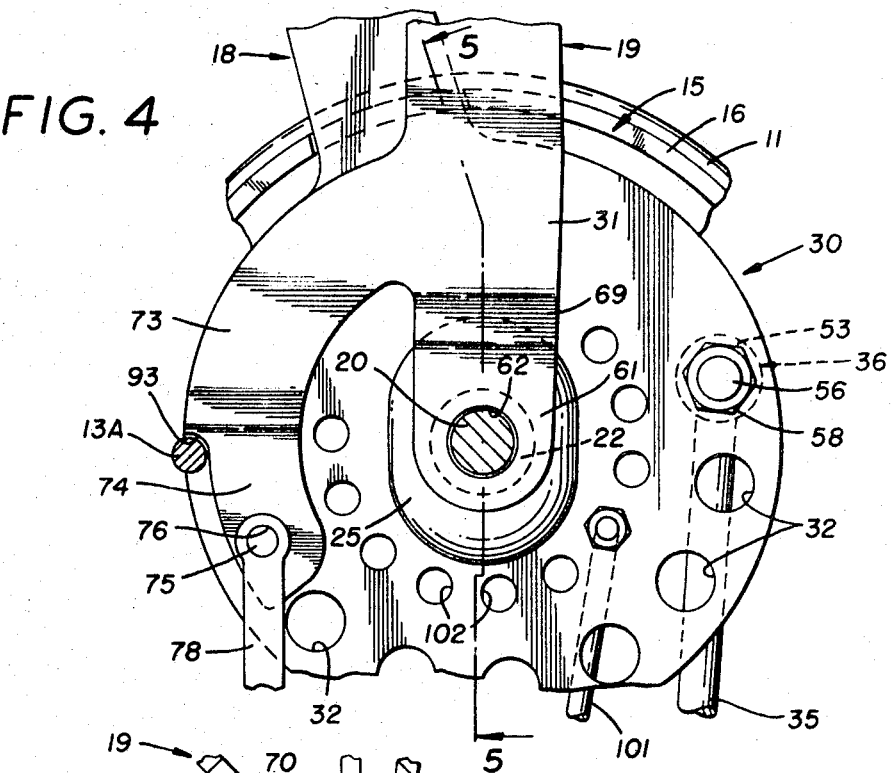
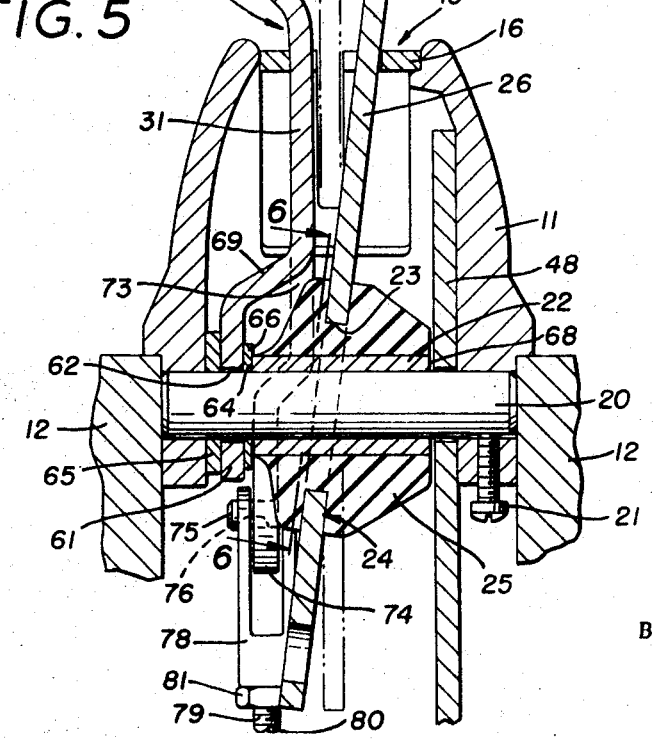
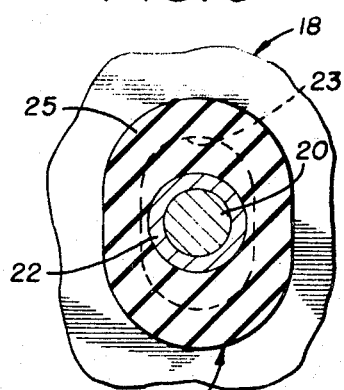

United States Patent Office 3,470,771
Patented Oct. 7, 1969

3,470,771
TRANSMISSION AND AUXILIARY THROTTLE CONTROL HAVING A SAFETY INTERLOCK
Richard D. Houk, Stow, Ohio, assignor, by mesne assignments, to North American Rockwell Corporation, Pittsburgh, Pa., a corporaion of Delaware
Filed Jan. 30, 1968, Ser. No. 701,605
Int. Cl. G05g 13/02
U.S. Cl. 74—876       10 Claims

ABSTRACT OF THE DISCLOSURE

A control for operating a transmission and supplying auxiliary throttle control. The control has a transmission selector lever and a throttle control lever adapted for operative connection to a transmission and throttle, respectively. Both said control levers are mounted on a support shaft in the housing of the control to permit rotation thereabout for selective actuation of the transmission and throttle. The control embodies a blocking means so that the transmission selector lever cannot leave its neutral position when the throttle control lever is advanced from the idle position, and conversely, the blocking means prevents the throttle control from leaving its idle position when the transmission selector lever is in other than its neutral position.

BACKGROUND OF THE INVENTION

The present invention relates generally to transmission and throttle controls. Specifically, the present invention relates to an interlock between the transmission selector lever and an auxiliary throttle control lever.

Many types of power equipment are operated from a stationary position and yet can be vehicularly self-propelled from one location to another. Similarly, many vehicles are provided with power take off arrangements for operating stationary working devices. In both situations a transmission is utilized to connect the power source to the propelling means of the vehicle and selectively to disconnect the power source from the propelling means to allow independent operation of the working device. In both situations the power source is controlled by a throttle.

While the power source is being propelled from one working location to another the operator can generally vary the power by a foot pedal, thus freeing his hands to steer and operate the transmission selector lever. However, when the power source is properly positioned, the transmission selector is moved to the neutral position and the power source operated by an auxiliary throttle control to operate the working device. In many situations the power source must provide considerable power to operate the working device so that should the transmission lever be accidentally moved from its neutral position, or should the transmission selector lever not have been fully moved to neutral, the power source would be propelled inadvertently away from its desired location, and often with disastrous results.

As an example, much of the vehicular ground equipment utilized to service aircraft has an engine which not only propels the vehicle from place to place but also powers the accessory on the vehicle. High lifts, baggage conveyors and fuel tankers are representative examples of typical accessories powered by the vehicle engine.

When such accessories are in use, and even though the vehicle is stationary, the engine must often be operated at high speed. Inasmuch as the operator is often required to leave his position at the controls during operation of the accessory, the engine speed is selected by an auxiliary throttle control that will retain the desired setting. The stationary position of the vehicle is maintained by placing the transmission selector lever in neutral position and applying the brakes.

Although the brakes may be sufficient to hold the vehicle against gravity while the accessory is operating, they are not sufficient to hold the vehicle with the auxiliary throttle advanced should the transmission selector lever accidentally be moved into drive position, or inadvertently not have been properly placed in neutral. In such situations, the vehicle will lurch unexpectedly from its position. In the airline industry many planes have suffered extensive damage because of this problem.

SUMMARY OF THE INVENTION

It is therefore a primary object of the present invention to provide a control in which operation of the transmission selector lever and the throttle control lever are mutually exclusive.

It is another object of the present invention to provide a control, as above, in which the throttle control lever can only be advanced from idle position when the transmission selector lever is in neutral.

It is a further object of the present invention to provide a control, as above, in which the transmission selector lever can only be moved from neutral when the throttle control lever is in idle position.

These and other objects of the present invention, as well as the advantages thereof over existing and prior art forms, will be apparent in view of the following detailed description of the attached drawings and are accomplished by means hereinafter described and claimed.

In general, a control embodying the concept of the present invention has a transmission selector lever and a throttle control lever mounted for rotation on a support shaft in the control housing. The arm portion of each control lever extends outwardly through a guide means. The guide means preferably comprises a slot which defines an operating range. Extending laterally of this slot is one offset that delineates an idle throttle position and a second offset that delineates a neutral transmission position.

A blocking means permits only one control lever at a time to move through the operating range while restricting the other control lever to its respective offset. The blocking means is preferably incorporated in two, independent, but cooperative, arrangements within the control. One arrangement in the blocking means comprises a wing means on one of said control levers that cooperates with a blocking shoulder on the other control lever. The second arrangement in the blocking means comprises the use of a guide slot for the operating range the width of which is greater than the thickness of either of the control levers but lesser than the combined thickness of both said control levers.

One preferred embodiment is shown by way of example in the accompanying drawings and is described in detail without attempting to show all of the various forms and modifications in which the invention might be embodied; the invention being measured by the appended claims and not by the details of the specification.

DESCRIPTION OF THE DRAWINGS

FIG. 4 is an enlarged cross section taken substantially on line 4—4 of FIG. 2;

FIG. 5 is a further cross section taken substantially on line 5—5 of FIG. 4;

FIG. 6 is a still further cross section taken substantially on line 6—6 of FIG. 5; and, FIG. 7 is a reduced cross section taken substantially on line 7—7 of FIG. 2.

DESCRIPTION OF A PREFERRED EMBODIMENT

Figure 1:
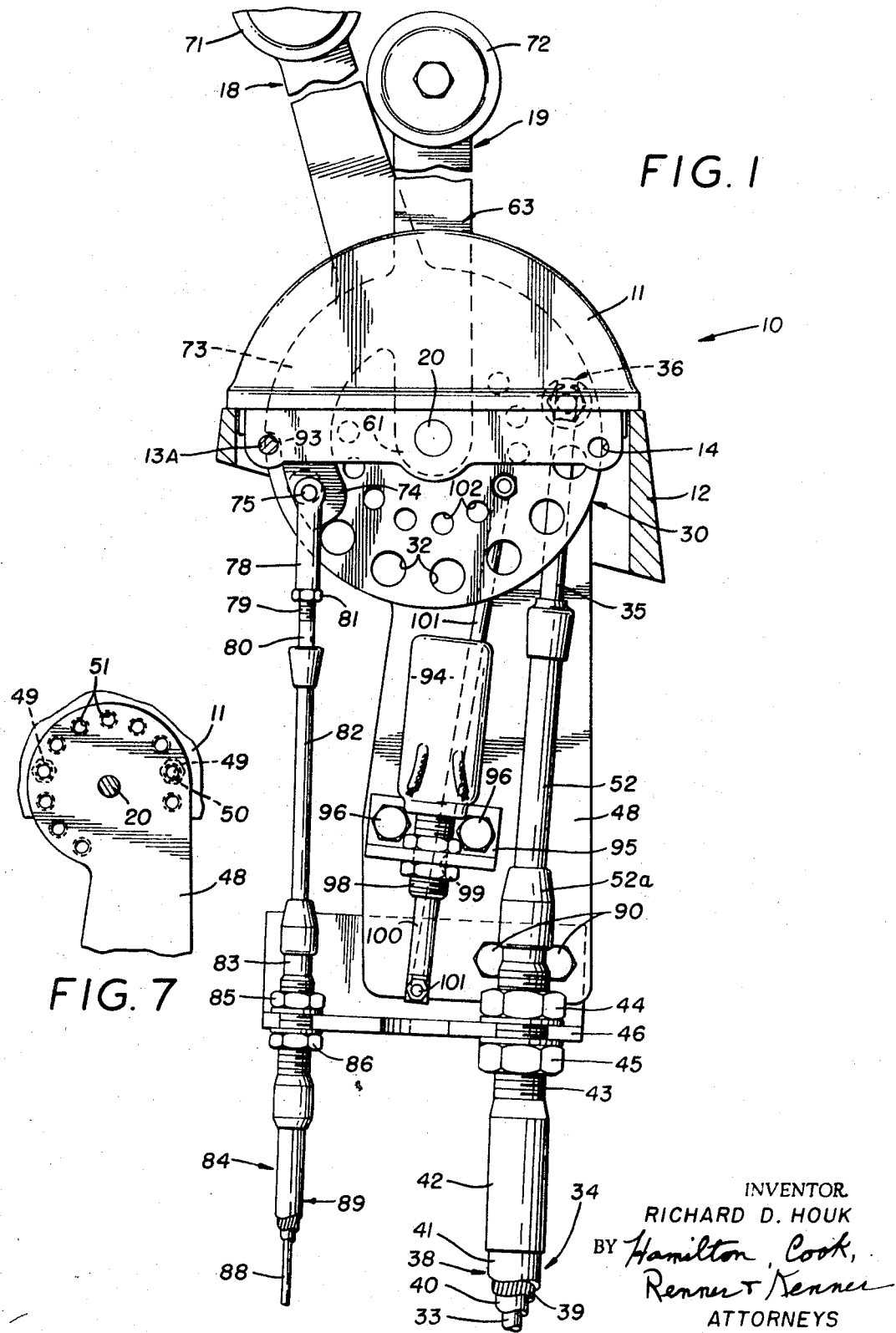
FIG. 1 is a frontal elevation of a control embodying the concept of the present invention mounted on a stanchion depicted in section.

A control embodying the concept of the present invention is indicated generally by the numeral 10 in the attached drawings. The housing 11 of the control 10 depicted is adapted to be secured to a vertical mounting console 12, as by bolts 13 threadedly received in bores 14 in housing 11, and presents an upwardly oriented throat 15. It must be appreciated that the orientation is not critical, and the housing 11 may be mounted to accommodate the exigencies of any particular installation.

A guide plate 16 is secured to the housing across the throat 15 with the transmission selector and throttle control levers 18 and 19, respectively, extending outwardly therethrough. A support shaft 20, extending transversely of, and beneath, the guide plate 16, is fixed in a housing 11, as by set screw 21. The control levers 18 and 19 are journaled on the support shaft 20.

The transmission selector lever 18 is journaled for rotation about shaft 20 and, to a limited extent, is permitted to swing laterally of the plane through which the lever 18 normally rotates. In the preferred embodiment this is accomplished by the use of a journal sleeve 22 that extends through a journal aperture 23 in the hub portion 24 of the transmission selector lever 18 and is secured therein by a resilient biasing bushing 25 (FIGS. 5 and 6). In the preferred form the bushing 25 is a high quality rubber vulcanized onto both the hub portion 24 of the lever 18 and the exterior of the journal sleeve 22 so as to be permanently attached therebetween. The sleeve 22 is canted with respect to the axis of the hub portion 24. In the unstressed condition of bushing 25—i.e., before the sleeve 22 is received on shaft 20— the sleeve 22 is canted to an even greater extent with respect to the axis of the hub portion 24 than is shown in FIG. 5. This results in a prestressing of the bushing to bias the lever 18 laterally when the sleeve is mounted on shaft 20. This prestressing also tends to force the sleeve axially along the shaft in a direction opposite to the direction in which the lever is biased for a purpose more fully hereinafter explained.

The journal aperture 23 is preferably in the form of an elongate slot with the major axis thereof generally paralleling the axis of the arm portion 26 of lever 18. The bushing 25 is transversely elongate in the same direction as the elongation of the journal aperture 23, and the axis of sleeve 22, while canted, passes through the center of the aperture 23 and lies in that plane coincident with the major axis of the journal aperture 23 and the longitudinal axis of shaft 20. The orientation and relative dimensions of the journal aperture tends to preclude torsional movement of the control lever 18, as is more fully set forth in U.S. Patent No. 3,350,957, to John F. Morse.

The biasing action provided by the prestressing of bushing 25 resiliently urges the lever 18 laterally of the guide slot 28 toward the neutral offset 29 in guide plate 16, and yet, because the journal sleeve 22 is rotatably received on the shaft 20, the lever 18 is free to move therewith about shaft 20.

A wing means 30 may be formed as a radial enlargement of the hub portion 24 of control lever 18. The wing means 30, in cooperation with a shoulder 31 on control lever 19 forms one arrangement in the blocking interlock, as is hereinafter more fully described.

The radially enlarged hub portion 24 also functions as a throw arm and presents a plurality of anchor bores 32 by which the core 33 of the push-pull cable 34, or other suitable motion transfer means, may be secured to the control lever 18. That end of the core 33 not shown is attached to an automatic transmission, and the other end is connected, by the end rod 35, to a trunnion connector 36 mounted in the selected anchor bore 32.

The push-pull cable 34 may be of any conventional construction having a core 33 reciprocably slidable within a casing 38 to transmit mechanical motion by the application of either tensile or compressive forces to the core 33.

In the exemplary construction depicted, the casing 38 is formed of a plurality of casing wires 39 laid contiguously, in the form of a long pitched helical coil, about the radially outer surface of an inner, flexible, plastic tube 40 which extends the full length of the casing 38. An outer cover 41 encases the coil of wires 39 up to within a short distance from the ends thereof.

A fitting 42 is positioned over the end of the cable casing 38 and is cold swaged, or otherwise suitable connected, onto the exposed portion of the cylindrical grouping of wires 39. A plurality of annular ribs, not shown, may be provided within the fitting 42 which, when crimped onto the cover 41, effect a seal between the end fitting 42 and cover 41.

A portion of the outer surface of the end fitting 42 is threaded, at 43, to receive a pair of opposed lock nuts 44 and 45 which can be tightened against the foot portion 46 of the mounting plate 48 secured to, as by cap screws 49, and extending downwardly of, the housing 11.

By utilizing a pair of cap screws 49 extending through bores 50 in the housing 11 and receivable in selected of threaded bores 51 provided on a bore circle on mounting plate 48 (FIG. 7), the plate 48 may be selectively positioned with respect to the housing 11 to accommodate various cable orientations.

An extension tube 52 is gyrationally mounted on the end fitting 42, as by a socket wtihin flexible sleeve 52A. The end rod 35, which is secured to the cable core 33, is slidably received within the extension tube 52. The extension tube 52 is closely fitted around the end rod 35 to guide the rod 35 and to prevent excessive deflection of that portion of the core 33 sliding therein, particularly when subjected to compressive loads.

The trunnion connector 36, by which the end rod 35 is secured to the control lever 18, has a head portion 53 transversely bored, at 54, to receive the end rod 35. As shown, the bore 54 may be threaded matingly to receive the correspondingly threaded end rod 35, and a lock nut 55 assures the connection. A stem portion 56 extends outwardly of the head portion 53 of connector 36 and is received within that bore 32 selected for the most propitious movement of the core 33 in response to rotation of control lever 18. The stem portion is loosely received in bore 32 so as not to bind when the lever is moved laterally, and a retaining means, such as the lock nut 58 tightened on the threaded end of the stem portion 56, maintains the connector 36 attached to the desired bore 32.

The power, or throttle, control lever 19 is also mounted for rotation about shaft 20, to permit movement thereof through the throttle range defined by the guide slot 28 in guide plate 16. In addition, the throttle control lever 19 is permitted, to a limited extent, to move laterally of guide slot 28. This accommodates movement of lever 19 between the slot 28 and the idle offset 60. To allow the desired lateral movement the hub portion 61 of lever 19 is bored, as at 62, to fit loosely over shaft 20. This loose fit need only be on the order of several thousandths of an inch so that the arm portion 63 of lever 19 may swing laterally between the idle offset 60 and the guide slot 28 in plate 16 without adversely affecting the rotational mounting of lever 19 on shaft 20.

The axial extent of the journal sleeve 22 is sufficient that one end 64 thereof biases, by the prestressed condition of bushing 25, the hub 61 of lever 19 against a low friction washer 65, itself juxtaposed against the interior wall of the housing 11. A similar washer 66 is also preferably positioned between the hub portion 61 and the end 64 of the journal sleeve 22. The other end 68 of the journal sleeve 22 is maintained slightly apart from the backing plate 48 by the prestressing of bushing 25. This prestressing of bushing 25 results in the transmission selector lever 18 being biased against the neutral offset 29, and the reaction force therefrom biases journal sleeve 22 away from plate 48, as best shown in FIG. 5. The resilience of bushing 25, however, permits the sleeve 22 to move axially of the shaft 20° and thereby accommodate the movement of the hub portion 61 when the arm portion 63 of lever 19 is swung, against the biasing prestress of bushing 25, from the idle offset 60 into the operating range defined by the guide slot 28.

Figure 2:
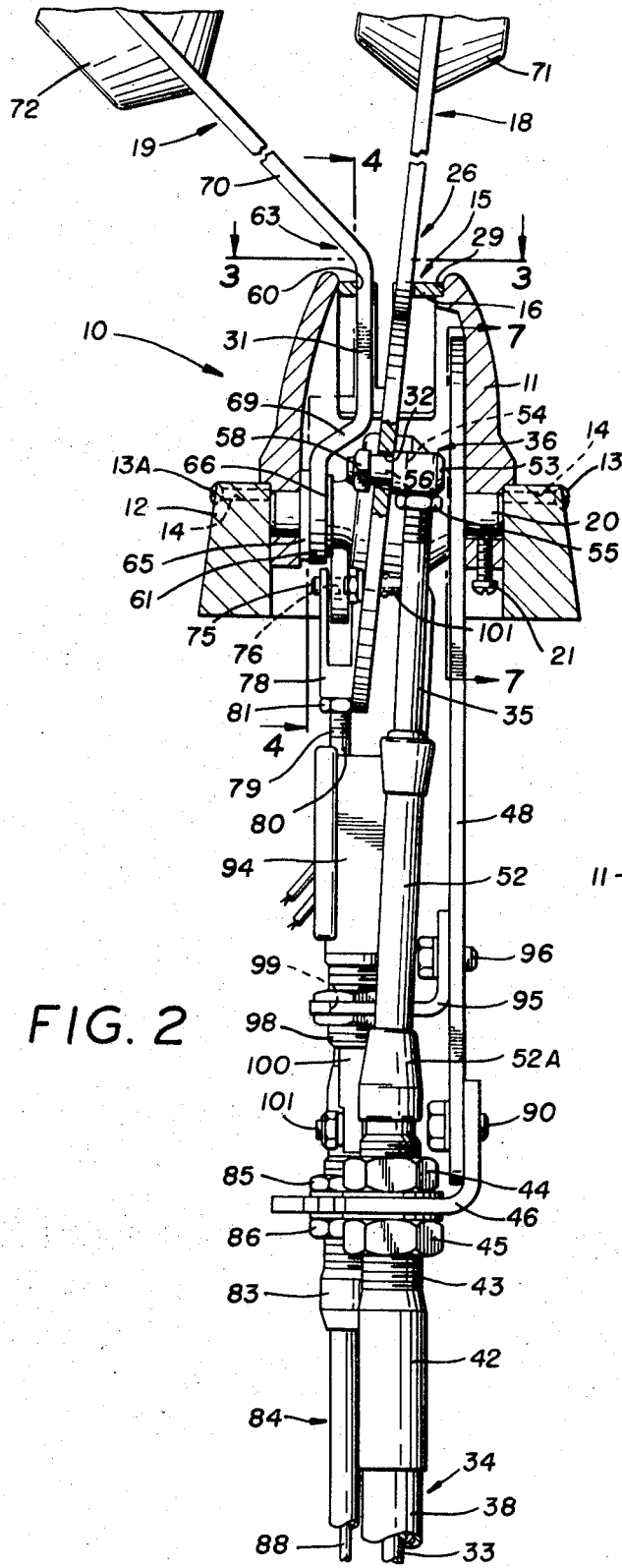
FIG. 2 is a side elevation, partly in section and partly broken away.

As shown in FIGS. 2 and 5, the hub portions 24 and 61 of the levers 18 and 19, respectively, are spaced axially along support shaft 20. The arm portion 26 of lever 18 extends radially of its hub portion 24, but the arm portion, designated generally by the numeral 63, of lever 19 has an inclined portion 69 which angles from the hub to the radially directed blocking shoulder 31 and a handle extending portion 70 which dog-legs outwardly from the blocking shoulder 31 and away from lever 18. This inclination of the handle extending portion 70 assures that the knobs 71 and 72 on the ends of levers 18 and 19, respectively, will not interfere.

A throw arm 73 extends outwardly from the blocking shoulder 31 generally concentrically of the hub portion 61 and for a circumferential extent sufficient that the motion transmitting device attached thereto will not be obstructed by the shaft 20, journal sleeve 22 and biasing bushing 25 as the lever 19 is rotated through its full range. To preclude interference of the motion transmitting device attached to throw arm 73 from interfering with the wing means 30 on control lever 18, the connecting tip 74 on throw arm 73 is displaced axially from the main portion thereof (FIG. 5).

A pin 75 extends through a bore 76 in the connecting tip 74 of throw arm 73 and secures the clevis connector 78 to the throw arm 73. The base portion of the clevis connector 78 may be bored and tapped to receive the threaded portion 79 of an end rod 80 therein. A lock nut 81 secures the attachment of the end rod 80 to the clevis connector 78.

The end rod 80 is slidably received within an extension tube 82 that is also gyrationally mounted on the end fitting 83 of a push-pull cable 84. The end fitting 83, like end fitting 42, is locked onto the foot portion 46 of mounting plate 48 by lock nuts 85 and 86. Interiorly of the extension tube 82 the end rod 80 is secured to the core 88 which is reciprocably slidable within the push-pull cable casing 89. The opposite end of the core 88, not shown, is operatively connected to the throttle. As best seen in FIG. 1, the push-pull cable 34 used to shift the transmission is generally of a larger size than the push-pull cable 84 required to control the throttle. The foot portion 46 is, therefore, normally required to mount end fittings of different diameters. The cable sizes may, however, differ from installation to installation in order to meet the individual requirements encountered. For that reason it is preferred that the foot portion 46 be demountably secured to the mounting plate 48, as by bolts 90.

With the throttle actuating lever 19 positioned in the idle offset 60 the transmission selector lever 18 may be laterally pivoted against the biasing action of prestressed bushing 25 to displace the arm portion 26 of lever 18 from the neutral offset 29 into the guide slot 28. The operator may then rotate the lever 18, about shaft 20, through the operating range selectively to the forward or reverse drive positions 91 and 92, respectively. Once the selector lever 18 is in the guide slot 28, the throttle control lever 19 cannot leave the idle offset 60.

First, the guide slot 28 is of such limited width that the control levers 18 and 19 cannot be simultaneously received therein in a side-by-side relationship. Second, the blocking shoulder 31 on lever 19 is constantly juxtaposed with the arm portion 26 of lever 18, or the wing means 30 extending planarly therefrom, when the transmission selector lever 18 is in the guide slot 28. As such, the throttle control lever 19 is wholly immobolized while the transmission selector lever 18 is within the guide slot 28. Accordingly, the operator is required to use a foot pedal, or other primary throttle control, to control the speed at which the vehicle is propelled when the transmission is "in gear." This is quite convenient since the throttle control on most vehicles is ordinarily a foot operated accelerator pedal. With the transmission "in gear" and when using the foot throttle control, the operator is assured that the throttle control lever 19 cannot be accidentally advanced from the idle position 60 contrary to his actuation of the pedal control.

When the transmission selector lever 18 is returned to a position adjacent the neutral offset 29, the arm portion 26 of lever 18 is biasingly seated in offset 29 by the action of the resilient bushing 25. Under this condition, and only under this condition, the throttle control level 16 can be pivoted laterally out of the idle offset 60 for entry into the guide slot 28. This occurs because, as the arm portion 26 of the transmission selector lever 18 seats in the idle offset 29, both it and the blocking wing means 30 extending planarly therefrom are displaced sufficiently from the shoulder 31 on lever 19 to allow the arm portion 63 of lever 19 to be swung laterally from the idle offset 60 into guide slot 28.

As the throttle control lever 19 moves into the guide slot 28 from the idle offset 60, the blocking shoulder 31 thereon is again juxtaposed with the transmission selector lever 18 and wing means 30 so that so long as the throttle control lever 19 is in guide slot 28 the transmission selector lever 18 is blocked in the neutral offset 29.

When the throttle control lever 19 is returned to the idle position the arm portion 63 thereof is biased into the idle offset 60. The engagement of the hub 61 against the washer 65, and thereby housing 11, by the biasing action of journal sleeve 22 tends to maintain the hub 61 oriented transversely of shaft 20. As shown in FIG. 5, the inclined portion 69 of lever 19 offsets the blocking shoulder 31 from the hub 61 only sufficiently for the arm portion 63 to be received in the idle offset 60. The resilient positioning of the sleeve 22, together with the loose fit of the hub bore 62 on shaft 20 and the spaced relation of sleeve end 68 from the backing plate 48 permits the arm portion 63 to be swung laterally from the idle offset 60 into the guide slot 28. It is this same configuration that biases the arm portion 63 into the idle offset position.

Figure 3:
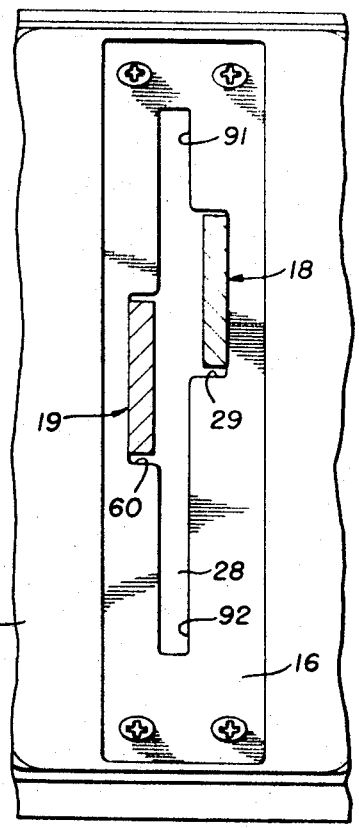
FIG. 3 is an enlarged top plan, partly in section, taken substantially along line 3—3 of FIG. 2.

Referring to FIG. 3 it may be observed that the idle offset 60 is placed medially with respect to the guide slot 28. This would permit the lever 19 to be moved in either direction as it enters the guide slot 28. However, by providing a slot shoulder 93 on the radially outer juncture of the tip portion 74 with the throw arm 73, that mounting bolt 13A adjacent the shoulder 93 may extend through the housing 11 and provide a stop against which the shoulder 93 abuts should the throttle control lever 19 be attempted to be moved in the wrong direction.

It should now be apparent that by utilizing a control embodying the present invention it is impossible for the transmission to become engaged while the auxiliary throttle control lever 19 is operating the power source at more than idle speeds.

The improved control 10 may also be provided with a safety switch 94. An angle bracket 95 is secured to the mounting plate 48 by a pair of cap screws 96, and the neck 98 of switch 94 is affixed through an opening 99 in the upstanding arm of the bracket 95. The trip arm 100 of switch 94 extends outwardly through the neck 98 and is attached to a link 101 which extends toward and is connected to the transmission selector lever 18. As shown, a plurality of bores 102 may be provided circumferentially of the hub 24 on lever 18 so that the link 101 may be adjustably positioned with respect to the lever 18 in order that the switch 94 will permit the engine, or power source, to be started only when the transmission is in neutral.

A control constructed according to the concept of the present invention thus accomplishes the objects thereof.

I claim:

1. A control for operating a transmission and supplying auxiliary throttle control comprising, a housing, a guide means carried by said housing and defining an operating range, a throttle control lever and a transmission selector lever operatively mounted in said housing and extending within said guide means, an idle throttle control lever position and a neutral transmission selector lever position defined by said guide means, said throttle control lever selectively movable through said operating range to control a throttle and said transmission selector lever movable through said operating range to shift a transmission, interaction of said control lever and selector lever with said guide means, and a blocking interlock between said control lever and selector lever cooperating to restrict said transmission selector lever at said neutral position when said throttle control lever is in said operating range and to restrict the throttle control lever to said idle throttle position when the transmission selector lever is in the operating range.

2. A control, as set forth in claim 1, in which the blocking means comprises a wing means on one of said control levers and a cooperating blocking shoulder on the other of said control levers.

3. A control, as set forth in claim 2, in which the guide means has a guide slot defining said operating range with an idle offset and a neutral offset, the width of said guide slot being greater than the thickness of either of said control levers, but lesser than the combined thickness of both said control levers.

4. A control for operating a transmission and supplying auxiliary throttle control comprising, a housing, a suppport shaft and guide means supported in said housing, a transmission selector lever having a hub portion and an arm portion, the hub portion of said transmission lever journaled on said support shaft with said arm portion extending outwardly through said guide means, a throttle control lever having a hub portion and an arm portion, the hub portion of said throttle control lever also journaled on said support shaft with said arm portion extending outwardly through said guide means, said guide means defining an operating range, an idle throttle position and a neutral transmission position, the arm portion of said transmission selector lever and the arm portion of said throttle control lever movable through the operating range and selectively receivable in the neutral transmission and idle throttle positions, respectively, biasing means resiliently urging the arm portion of said transmission selector lever to said neutral transmission position and the arm portion of said throttle control lever to said idle throttle position, and blocking means to restrict the arm portion of said transmission selector lever to said neutral transmission position when the arm portion of said throttle control lever is in the operating range defined by said guide means.

5. A control, as defined by claim 4, in which said blocking means restricts the arm of said throttle control lever to said idle throttle position when the arm portion of said transmission selector lever is in the operating range.

6. A control, as defined by claim 4, in which the idle throttle and neutral transmission positions are offset from the operating range of said guide means and in which the biasing means comprises a journal sleeve resiliently secured through the hub portion of one of said control levers, said sleeve journaled on said support shaft to bias the arm portion of the control lever to which it is secured into its respective offset, said sleeve cooperating with the hub portion of the other of said control levers to bias the arm portion thereof into its respective offset.

7. A control, as set forth in claim 6, in which the operating range is defined by a guide slot in said guide, said guide slot oriented transversely of said support shaft and the blocking means comprises a cooperative interrelationship of that dimension of said guide slot and the corresponding dimension of the control levers extending through said guide means measured generally parallel to said support shaft, the said dimension of said guide slot being greater than the corresponding dimension of either control lever but lesser than the combined corresponding dimension of both said control levers.

8. A control, as defined by claim 7, in which the blocking means also comprises a wing means on one of said control arms and a blocking shoulder on the other of said control arms, said wing means and blocking shoulder cooperating to restrict the arm portion of either control lever to its respective offset when the other control lever is in the guide slot.

9. A control, as defined by claim 8, in which the journal sleeve is normally canted with respect to the axis of the hub portion of that control lever to which it is resiliently secured.

10. A control, as defined by claim 9, in which the hub portion of the other of said control levers is loosely journaled on said support shaft to permit selective swinging of that control lever transversely of said guide slot.

References Cited

UNITED STATES PATENTS

| 2,234,019 | 3/1941 | Bragg | 74—875 X |
| 2,534,168 | 12/1950 | Greenwood | 74—875 X |
| 2,771,168 | 11/1956 | Panish | 74—873 X |
| 2,808,733 | 10/1957 | Fageol | 74—876 |
| 3,101,821 | 8/1963 | Henry | 74—876 X |

ARTHUR T. McKEON, Primary Examiner

U.S. Cl. X.R.

74—473